United States Patent

[11] 3,547,051

[72] Inventors Harold L. Komberec
North 1511 Wall St., 99201;
Dillon K. Kilcup, West 1012 Cleveland Ave., 99205; Alfred T. Smith, Otis Orchards, Spokane, Wash. 99027
[21] Appl. No. 679,961
[22] Filed Oct. 16, 1967
[45] Patented Dec. 15, 1970

[54] ICE CREAM SANDWICH FORMATION PROCESS
9 Claims, 2 Drawing Figs.
[52] U.S. Cl. .................................................... 107/54, 107/1
[51] Int. Cl. ........................................................ A23g 5/00
[50] Field of Search ........................................... 107/1, 1.2, 1.6, 1.65, 8.05, 54.4

[56] References Cited
UNITED STATES PATENTS
3,182,611 5/1965 Rubenstein .................. 107/54.4
3,363,586 1/1968 Jernigan et al. ............... 107/1.2

Primary Examiner—Laverne D. Geiger
Assistant Examiner—Robert I. Smith
Attorney—Keith S. Bergman ABSTRACT: A process for forming one- and two-cookie ice cream sandwiches on palletized quick-freezing equipment including extruding a shaped slab of ice cream on a pallet, placing a cookie on the upper surface thereof and freezing the first combined product. A second cookie may be combined with the first compound frozen product by loosening it from the pallet, preparing the uncovered ice cream surface for adherence with a second cookie and placement of a second cookie in place thereon. The frozen ice cream surface is prepared for cookie adherence by partial melting, or either ice cream or cookie surface may be prepared by addition of a freezable liquid or an edible adhesive substance.

PATENTED DEC 15 1970

3,547,051

Harold L. Komberec,
Dillon K. Kilcup, and
Alfred T. Smith,
INVENTORS,

BY
ATTORNEY.

3,547,051

ICE CREAM SANDWICH FORMATION PROCESS

RELATED APPLICATIONS

This application is related to application Ser. No. 675,706 filed Oct. 16, 1967, now U.S. Pat. No. 3,472,181 and application Ser. No. 675,695 now U.S. Pat. No. 3,512,485 filed Oct. 16, 1967, both of which set forth apparatus by which this process may be accomplished.

BACKGROUND OF THE INVENTION

1. Field of Invention

This invention relates generally to a process for forming a one- or two-cookie ice cream sandwich on existing palletized sharp freeze ice cream novelty equipment and more particularly to such a process that establishes one cookie on a performed, pallet-supported ice cream slab before sharp freezing and may adhere a second cookie to the frozen ice cream slab thereafter.

2. Description of Prior Art

Ice cream sandwiches, comprising a central slab of ice cream with a flour-based comestible of the cookie nature on one or both sides and with or without a coating, have become standard trade items in the stickless ice cream novelty field. Many machines and processes for the formation of such novelties have heretofore become known, but these have evolved generally into a first group requiring hand operation or at least being only semiautomated and into a second automated group that requires use of an external form or use of at least one cookie in a supporting fashion during the soft stage of the ice cream slab, which requires the use of particular forming or supporting devices or some particularly adapted form of handling the product, all of which is not compatible with use on existing palletized sharp freezing equipment.

The instant invention differs from this art by placement of the performed ice cream slab directly on the ordinary flat a pallet of existing sharp equipment, placement of a cookie on top thereof and freezing the whole to form an adhered unit. The ice cream resting on the pallet surface adheres sufficiently to maintain position of the product during transit through the freezing box, as in the case of ordinary methods thereafter. If a two-cookie sandwich be desired, the frozen product is removed from adhesion to the pallet, the surface modified by heat or otherwise to adhere to a second cookie, preferably by refreezing, and the second cookie placed in appropriate position to render the product ready for further processing.

SUMMARY OF INVENTION

In the present ice cream novelty trade many stickless novelties are formed in conjunction with a sharp freeze unit embodying essentially a sharp freeze box with an endless pallet-type conveyor circulating therein to freeze product and therefrom to receive and deliver product. Such equipment is today commonly merchandized in the form of Nelson boxes, Turner boxes and Polarmatic freezing units, each involving generally a sharp freeze box, a palletized conveyor unit having a part outside the box and another part circulating therethrough and extrusion apparatus adapted to timely place portions of extruded ice cream upon the pallets, and a means of removal of frozen product from the pallets. Such units have not heretofore been adapted to use in the ice cream sandwich trade, principally because if the sandwich trade, principally because if the sandwich be formed by prior methods, it will require such extensive additional supporting structure as to be economically impossible or the product will be supported completely or partially by a cookie on the pallet and since there is no substantial frictional engagement between cookie and pallet, the novelty is commonly displace from the pallet in the freezing box, with many attendant problems. Some attempts have been made to maintain a cookie on the conveyor pallet by some freezing adherent such as water or liquid ice cream, but this has not proven successful because the finished product is not perfectly formed and configured after removal from the pallet, and it is difficult to remove residue from the pallet.

The instant invention seeks to alleviate these problems by providing a particular process through which such ice cream sandwich novelties may be formed upon the existing sharp freeze equipment without structural modification thereof and by means of a simple, economical, ancillary structures placeable thereon. In so doing, it is:

A principal object of our invention to provide a process for the formation of ice cream sandwiches on commercial sharp freeze equipment having a pallet-type conveyor by extruding an ice cream slab on a pallet and placing only one cookie on top thereof before sharp freezing so that the ice cream product adheres to the pallet to maintain it thereon during transit in the freezing chamber.

A further object of our invention to provide such a process that adheres a second cookie, if desired, to the frozen product aforesaid by establishing a bond between the frozen ice cream and the second cookie that adheres without freezing or quickly freezes to establish a bond as great as that between ice cream and original cookie A still further object of our invention to provide such a process that may be carried out by simple, economical, ancillary structures associated with existing pallet-type sharp freezing units of commerce, without modification of the freezing units.

A still further object of our invention to provide such a process that is of new and novel nature, of simple and economical operation, of great utility, and one otherwise well adapted to the purposes for which it is intended.

These and other objects of our invention will become apparent from consideration of the following specification and accompanying drawings which form a part of this application. In carrying out the objects of our invention, however, it is to be understood that it is to be limited only by the following claims and that its essential steps are susceptible of change and modification in detail with only one preferred practical process being illustrated and specified, as required.

BRIEF DESCRIPTION OF DRAWINGS

In the accompanying drawings, wherein like numbers of reference refer to similar parts throughout.

DESCRIPTION OF THE PREFERRED EMBODIMENT

Figure 1:
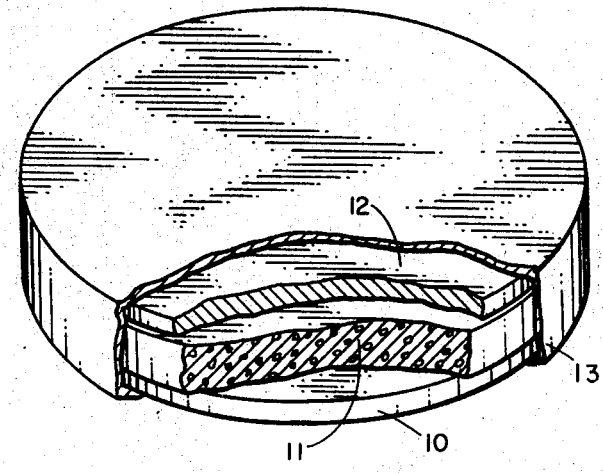
FIG 1. is an isometric illustration of a normal coated, two-cookie ice cream sandwich, partially cutaway to show its various parts, their configuration, and relationships.
Figure 2:
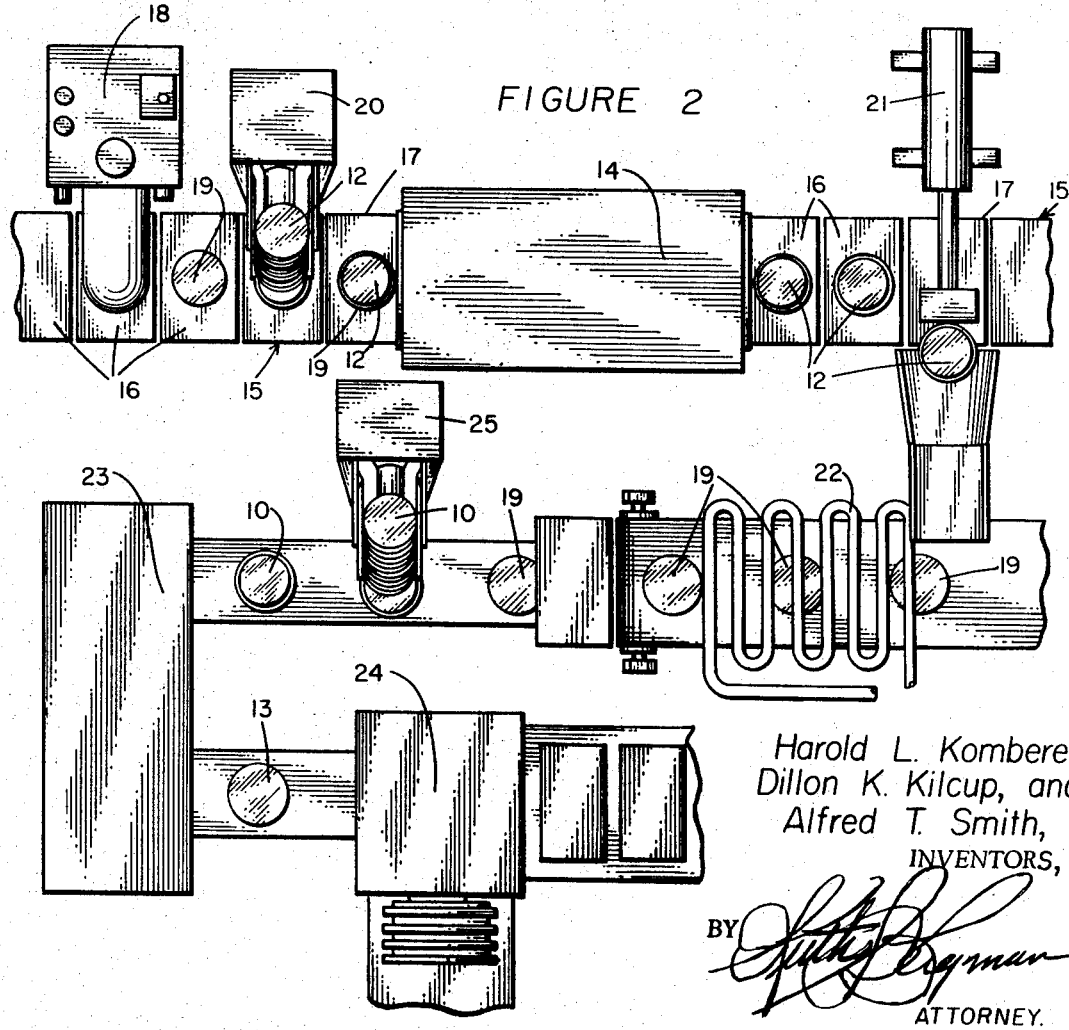
FIG. 2 is a semidiagrammatic illustration of the process of our invention showing its various steps associated with the apparatus performing them.

The typical coated, two-cookie ice cream sandwich shown in the illustration of FIG. 1 is seen to include bottom cookie 10 adhered to and supporting medial ice cream slab 11, which in turn adheres to and supports top cookie 12 on its upper surface; the sandwich oftentimes is covered with comestible coating 13, usually of chocolate or some similar settable substance. Such products may be formed with only one cookie, usually the bottom one, and may be formed without any type of coating 13. Most such sandwiches are of a rectangular or round shape, but the shape is not essential to the sandwich formation process, so long as there is a sufficient area of contact between ice cream slab and cookie to cause an appropriate adhesive bond therebetween. Commonly cookies 10, 12 are of substantially the same size as ice cream slab 11, but again this is not necessary and one cookie may be of a different size than the other and either or both may be of different size than the ice cream slab, though placement of such elements of different size is mechanically more complex.

The process of our invention is adapted for use with a sharp freezing unit of the Nelson, Turner or Polarmatic variety, all of which in general include freezing box 14 having associated pallet-type endless conveyor 15 with plural flat pallets 16 carried for motion in the freezing box with external portion 17 outside the box for placement and removal of product. An extrusion apparatus 18 is associated with conveyor element 15 to, at appropriately timed intervals, deposit a shaped quantity of ice cream 19 at predetermined position on each pallet 16. Such soft ice cream 19 is thence transported through freezer box 14 where it is maintained for a period of time until frozen to a hardened state and then returned externally of the freezer box to be removed from conveyor 15 for further processing. The shaped soft ice cream slab 16 is in a plastic state such as to hold its shape at normal room temperature for some short period of time, but not for extended periods. Such mechanism as aforesaid is necessary to the functioning of our process but not a part of our invention; these machines are commercially available and of common use in the ice cream novelty trade.

Our process for use in forming an ice cream sandwich on such equipment includes, essentially:

Step 1. Soft ice cream slabs having upper and lower substantially planar surface and of predetermined size and configuration are placed at a particular predetermined position on pallets 16 of the sharp freeze unit. The ice cream should be of the normal consistency commonly used in such machines, that is, a plastic material sufficiently deformable to allow extrusion in shaped form, but with sufficiently rigid consistency to maintain its shape and support a cookie until the combination be transported into the freezing box and frozen. The particular peripheral shape of the slab is not critical, but most convenient if it be a parallel sided section of a solid having vertically ruled surfaces, to allow for extrusion-type formation with normal ice cream extrusion equipment. The positioning in a predetermined location on a pallet is essential to our process to allow proper timing and positioning of other operations effecting the novelty.

Step 2. A cookie or other similar thin, rigid, sheetlike comestible is placed on top of the formed soft ice cream slab, with some pressure, to form an adherent bond therebetween. The liquid in the soft ice cream slab 16 will pass to some degree by osmosis or otherwise into the relatively dry cookie 12 to further aid the establishment of the bond between ice cream slab and cookie after freezing. Since ice cream slab 16 is in predetermined position on pallet 16, the cookie 12 may be placed by apparatus 20 known in the food manufacturing arts in proper position on the ice cream slab by timing devices associated with conveying structure 15; one type of such structure is disclosed in our copending patent application for MECHANISM FOR PLACEMENT OF FIRST COOKIE ON ICE CREAM SANDWICH, Ser. No. 675,706 filed Oct. 16, 1967 aforesaid. With cookies of normal size and density, the force caused by the weight of the cookie on the top surface of the soft ice cream slab is normally sufficient to establish a bond between the two elements, but if this be not so, it may be desirable to apply slight mechanical pressure between these units to establish an appropriate bond. If pressure be used, however, it must be such as not to unreasonably deform soft ice cream slab 19.

Step 3. The still soft ice cream slab with top cookie 12 in place is passed on pallet 16 by conveyor structure 15 into freezing box 14, where it is frozen to a hard, structurally rigid form and thence redelivered from the box by the conveyor. This freezing step is accomplished by conduction, convection, or both, in the same fashion as with other ice cream novelties now frozen by such apparatus, with the product emerging from the box at a temperature usually some few degrees below zero. This temperature renders ice cream slab 19 quite hard and enhances the bonding of cookie 12 to the slab. The time of freezing is not particularly critical to our process, but most machines of commerce operate at a speed that will produce approximately 100 units per minute with a freezing time of some 10 to 15 minutes for a normal size 3-ounce ice cream slab of average configuration and commercial density.

Step 4. The now combined frozen ice cream slab 19 and cookie 12, upon exit from the freezing box, is loosened from its supporting pallet by mechanical impact. This is generally accomplished by solenoid-activated hammers 21 included as a part of the normal freezing apparatus aforesaid, but obviously may be accomplished in any other fashion that releases the bond between the lower surface of ice cream slab 19 and the upper surface of pallet 16 without leaving any substantial residue of ice cream upon the pallet surface or damaging the ice cream surface. If only a one cookie product is desired, steps 5 and 6 are omitted and the process proceeds with step 7, et. seq.

Step 5. The uncovered surface of ice cream slab 19 is prepared for adherence of second cookie 10, if desired. The second cookie, when established in place upon the ice cream sandwich, must be adhered in such fashion that the combination forms a structurally rigid unit to allow further processing and handling. This requires a reasonably substantial bond between the second cookie and ice cream slab that would not be created by merely bringing adjacent surfaces of these two members together. This bond must also be established in such fashion as not to interfere with the physical aesthetic or edible features of the product and must be in conformity with various health regulations. Preferred methods of establishing such bond are:

a. The heating of the uncovered ice cream surface in reasonably rapid fashion so that only a relatively thin portion thereof will become fluid or semifluid. This may be accomplished by passing ice cream slab 19 over a heated surface thereunder, or, preferably, by turning the frozen unit over by well known apparatus and passing the product under an open flame 22 as this tends to promote more sanitary conditions.

b. The heating of the second cookie 10 that is to be placed on the ice cream slab by passing it over a heated surface or by using a direct flame, with preference again for the latter method because of more sanitary potentialities.

c. The application of some liquid such as water, or, preferably, liquid ice cream mix on either the uncovered surface of ice cream slab 19, the adjacent surface of second cookie 10, or both surfaces. Application by spraying on the cookie surface is preferable, to allow a greater time period between the spraying operation and the necessity of establishment of the second cookie in place.

d. The establishment of an edible adhesive substance between adjacent surfaces of frozen ice cream slab and the second cookie. Such an adhesive may be a viscous sugar solution or a mixture of edible fats and oils, or many other similar substances. Normally these substances will not freeze, at least in the normal sense of the word, but they do become more viscous or solid upon cooling.

Under any of the aforesaid methods, when the second cookie and ice cream slab come into contact there will be liquid or semiliquid matter therebetween which will be conducive to formation of an adherent bond between the two elements especially upon cooling or refreezing. Since the ice cream slab is quite cold, heat will rapidly be taken from the area of communication with the second cookie by conduction and refreezing or cooling of it readily accomplished so long as the unfrozen portion is not too massive.

Step 6. The place of the second cookie 10 upon the ice cream slab with sufficient pressure to form an adherent bond between the adjacent surface of the members. Again, if gravitational pressure be not sufficient to form the desired bond, it may be necessary to apply slight mechanical pressure upon the members. Mechanisms by which both this step and Step 5 may be accomplished are disclosed in our copending application for MECHANISM FOR PLACEMENT OF SECOND COOKIE ON FROZEN ICE CREAM SANDWICH, U.S. Pat. SER. No. 675,695, filed Oct. 16, 1967 aforesaid, though the functions may obviously be accomplished with other mechanisms 23 presently known in the confectionary art. The timing of this operation must be reasonably rapid, as the cookie must be established in place upon the ice cream slab 19 while at least one of the adjacent surfaces of ice cream slab or cookie has some substantially liquid material associated therewith.

Step 7. The coating of the formed sandwich with chocolate or other comestible covering material according to processes and with apparatus 23 well known and existing in the art, if such coating be desired. Coating of the product formed by our process is not necessary to the process, but generally desirable for the product as it aids in storage life, especially in preventing sublimation of moisture from the product during storage with resultant deterioration of the ice cream. If chocolate is not desired, various other known substances such as emulsified edible wax may be used in the process.

Step 8. The completed product is wrapped in the desired fashion and thereafter packaged and transmitted to appropriate storage facilities. Wrapping may be accomplished by machines 24 well known in the art in any particular fashion desired by the manufacturer, either individually or in multiple units.

It is to be noted from the foregoing description of our process that before the individual product is frozen, only one cookie is placed upon the ice cream slab and the uncovered side of the soft ice cream rests directly on a supporting conveyor pallet, so that a somewhat adherent bond may be established therebetween in the normal fashion of such machines, to maintain the product on the pallet during its progress through the freezing chamber. A cookie is not in contact with the pallet and no adherent is used that is not readily removable from the pallet surface upon exit of the frozen product from the freezing box.

It is further to be noted that, after freezing, an adherent bond is established between the adjacent surfaces of the second cookie and ice cream slab, which results in a structure of as great rigidity as an ice cream sandwich formed by placing both cookies on the ice cream slab while it is still soft. The structure formed by this process is quite sufficiently rigid to allow further processing by the normal means ordinarily employed in the ice cream novelty field, whereas, other cookie type products formed on such freezing machines have not had this capability.

It is further to be noted that the formation of the bond between second cookie and ice cream may be accomplished by processes quite adaptable to sanitary operations, as either or both of the adjoining surfaces of ice cream slab and second cookie may be heated, especially by an open flame, giving rise to operation most acceptable in the food-handling field and rendering the introduction of bacteria or other deleterious substances by our process extremely improbable; it, in fact, would tend to destroy microorganisms.

The foregoing description of our invention is necessarily of a detailed nature so that a specific embodiment of it might be set forth, as required, but it is to be understood that various changes, and modifications in detail may be resorted to without departing from its spirit, essence or scope.

We claim:

1. The process for forming an ice cream sandwich-type novelty on sharp freeze equipment including a freezing box, an associated pallet carrying endless conveyor circulating through the freezing box and having an external portion of input and removal of product, and an extrusion apparatus adapted to place configure slabs of ice cream on the conveyor pallets, including:
   establishing a preconfigured slab of extrudable ice cream, having substantially planar upper and lower surfaces, upon the conveyor pallets;
   placing a sheetlike comestible on the upper surface of such ice cream slabs with sufficient contact area with said ice cream slabs to form and adherent bond upon freezing;
   transmitting the combined product into the freezing chamber and maintaining it therein until is is solidly frozen;
   delivering the frozen product from the freezing chamber;
   releasing the frozen product from its support pallet;
   preparing at least one of the adjacent surfaces of the ice cream slab and a second cookie to be established thereon to form an adherent bond between the adjacent surfaces;
   placing the second cookie on the ice cream slab with the repaired surface therebetween; and
   maintaining the ice cream slab and the second cookie in the established position until the prepared surface therebetween forms and adherent bond between ice cream slab and the second cookie.

2. The invention of claim 1 wherein the methods of preparing the frozen ice cream structure to form an adherent bond with the second cookie comprises heating of the surface of the ice cream slab to form a relatively thin layer of semifluid ice cream, and placing the second cookie in position during the existence of the fluid layer.

3. The invention of claim 1 wherein the method of preparing the surface of said the ice cream slab to receive a second cookie comprises heating of the adjacent surface of the second cookie and placing the second cookie upon the ice cream slab so that the cookie melts a portion of the ice cream slab immediately adjacent and forms a bond therewith upon the refreezing of such melted ice cream.

4 The invention of claim 1 wherein the method of preparing the surface of the ice cream slab to for an adherent bond with a second cookie comprises placing a freezable liquid upon at least one adjacent surface of the ice cream and the second cookie and placing the ice cream slab and second cookie into adjacent communication during the existence of the fluid state of the liquid to form an adherent bond between the ice cream slab and second cookie upon refreezing.

5. The invention of claim 1 wherein the method of preparing the surface of the ice cream slab to form an adherent bond with a second cookie comprised the placing of an adhesive substance, selected from the group comprising solutions of sugars, emulsions of edible waxy substances and mixtures of edible fats, on at least one adjacent surface of the ice cream and a second cookie and thereafter placing the members in juxtaposition to establish an adherent bond therebetween.

6. The process of forming ice cream sandwiches, of the type having sheet-like cookies on opposed sides of a relatively flat ice cream slab, upon sharp freezing equipment of the type having a freezing box, endless, pallet-carrying conveying structure moveable therein but partially without said box for input and output of product and an ice cream extrusion unit for placement of configured soft ice cream thereon, comprising:
   extruding a configured soft ice cream slab upon pallets of the conveyor:
   placing a first cookie on top of the slab to form an area of communication therewith;
   freezing of the ice cream and first cookie product to a hardened stated.
   releasing of said frozen structure from the pallet;
   preparing the uncovered surface of the ice cream to form a bond with a second cookie;
   placing a second cookie upon the prepared surface of the ice cream structure; and
   maintaining the second cookie in place on the ice cream structure until the adjacent surfaces therebetween freeze to form a bond between the elements.

7 The invention of claim 6 wherein the preparation of the frozen ice cream structure to form a bond with a second cookie comprises the heating of the surface of the ice cream slab to form a thin layer of semifluid ice cream, and placing a second cookie in position thereon during the existence of the fluid layer.

8 The invention of claim 6 wherein the preparation of the surface of the ice cream slab to receive a second cookie comprises heating the adjacent second cookie surface and placing the second upon the ice cream slab so that a portion of the ice cream slab melts to form a bond with the second cookie upon refreezing.

9 The invention of claim 6 wherein the preparation of the surface of the ice cream slab to form an adherent bond with a second cookie comprises a placing a freezable liquid upon at least one adjacent surface of the ice cream and the second cookie and the subsequent placing of the members into adjacent communication during the existence of the fluid state of the liquid to form an adherent bond between the members upon refreezing.